United States Patent [19]

Szendel

[11] Patent Number: 5,362,075
[45] Date of Patent: Nov. 8, 1994

[54] METHOD AND APPARATUS FOR PROTECTING WHEEL BEARINGS IN IN-LINE ROLLER SKATES

[76] Inventor: Adrian J. Szendel, 7656 Broadview Rd., Ste. #308, Parma, Ohio 44134

[21] Appl. No.: 3,011

[22] Filed: Jan. 11, 1993

[51] Int. Cl.⁵ .................. A63C 17/06; A63C 17/22
[52] U.S. Cl. .................. 280/11.22; 280/11.27; 301/5.7
[58] Field of Search .......... 280/11.19, 11.22, 11.23, 280/11.27; 301/5.3, 5.7

[56] References Cited

U.S. PATENT DOCUMENTS

| | | | |
|---|---|---|---|
| 1,188,377 | 6/1916 | Weaver | 280/11.27 |
| 1,489,197 | 4/1924 | Daverkosen et al. | 280/11.27 |
| 1,674,087 | 6/1928 | Beemer | 301/5.7 |
| 2,022,347 | 11/1935 | Hoerle | 301/5.7 |
| 2,150,814 | 3/1939 | Barbato | 280/11.27 |
| 4,408,803 | 10/1983 | Green et al. | 301/5.7 |
| 4,511,182 | 4/1985 | Birnbaum | 301/37 P |
| 4,909,523 | 3/1990 | Olson | 280/11.22 |
| 4,962,968 | 10/1990 | Caplin | 301/108 SC |
| 5,028,058 | 7/1991 | Olson | 280/11.22 |
| 5,048,848 | 9/1991 | Olsen et al. | 280/11.22 |
| 5,068,956 | 1/1991 | Malewicz | 280/11.27 |
| 5,092,614 | 3/1992 | Malewicz | 280/11.22 |

Primary Examiner—Richard M. Camby
Assistant Examiner—Peter C. English
Attorney, Agent, or Firm—Hopgood, Calimafde, Kalil & Judlowe

[57] ABSTRACT

A device for protecting the bearings of the in-line roller skates provided in the form of an axle aperture plug. Each axle aperture plug comprises a spacer portion, a transverse axle bore and a protective flange. The spacer portion has an inner bearing surface for engaging the inner race and spacing the outer race from the frame of the in-line skate. The transverse axle bore through the spacer portion permits passage of an axle along the central axis of rotation of the wheel. The transverse axle bore has a cross-sectional diameter allowing the entire length of the axle to be slidably insertable through the transverse axle bore. The protective flange is disposed about the spacer portion and has a surface which extends symmetrically away from the transverse axle bore and terminates in an outer bearing surface adapted for proximate positioning with respect to the outer race of the wheel bearing when the aperture plug is installed in the in-line roller skate. In this way, the wheel bearing is protected from exposure to particulate contaminants during use of the in-line roller skate by the skater.

8 Claims, 4 Drawing Sheets

METHOD AND APPARATUS FOR PROTECTING WHEEL BEARINGS IN IN-LINE ROLLER SKATES

BACKGROUND OF INVENTION

1. Field of Invention

The present invention relates to an improved axle aperture plug for use in-line roller skates, and more particularly to a method of protecting the wheel bearings thereof using the same.

2. Brief Description of the Prior Art

In-line roller skates are well known in the art. The history of in-line roller skates is provided in the background of U.S. Pat. No. 5,048,848 which is incorporated herein by reference.

One type of in-line roller skate which have enjoyed enormous popularity over recent years is shown in FIGS. 1 through 4. As illustrated in FIG. 1, this in-line roller skate includes an elongated, light-weight elastic frame 1 to which a plurality of substantially identical in-line skate wheels 2A, 2B, 2C, and 2D are rotatably mounted. The frame carries a brake assembly 3 at the rear end thereof and is mounted to a boot 4 which provides protection and support to the foot and ankle of the skater.

A pair of front axle apertures 5A, 5B are formed at the front end of rails 1A and 1B of frame 1. A pair of rear axle apertures 6A, 6B are formed at the rear end of the side rails of the frame, respectively. Front axle apertures 5A, 5B confront one another and are coaxial in the axle associated with front wheel 2A. Rear axle apertures 6A, 6B confront one another and are coaxial with the axle associated with rear wheel. Two pairs of intermediate axle apertures 7A, 7B and 8A, 8B are formed in rails 1A and 1B, between the forward and rearward apertures. Apertures 7A, 7B and 8A and 8B confront each other and are coaxial with the wheel axles which mount wheels 2B and 2C, respectively. Each axle aperture in the frame has an oblong or oval configuration extending generally vertically and receives an axle plug aperture 9A in order to position the intermediate wheels in either an upper or lower position. When axle aperture plugs are inserted into the axle apertures in a particular orientation, all of the wheels are perfectly aligned with their axles disposed in a common plane parallel to the riding surface. As shown, each wheel 2A, 2B, 2C and 2D is substantially identical in construction, and is centered between side rails 1A and 1B on a common plane with each central axis of wheel rotation 10 being perpendicular to plane 11.

As illustrated in FIGS. 2 and 3, each wheel has an outer tire member 12 formed of resilient, yieldable polyurethane material which is molded about and closely encapsulates the outer portion of a central hub 13 which rotates about the central axis of the wheel. The hub is molded of plastic or other suitable synthetic material and has an outer substantially rigid ring 13A which is concentric with a smaller inner ring 13B. These substantially rigid rings are interconnected by a plurality of substantially rigid vanes 13C which are molded integrally with the hub. The inner ring has left and right bearing apertures 14A and 14B into which substantially identical left and right bearings 15 and 16 are received and frictionally retained.

As best shown in FIG. 3, bearings 15 and 16 each have a number of subcomponents, namely: a central axle bore 17, an inner race 18, an outer race 19, a flat annular-shaped outer face 20A covering ball bearing 21 and a flat annular shaped inner face 20B, in which the inner face is positioned in the hub adjacent bearing abutment 13D. Each wheel is provided with a bearing sleeve 22 having a raised central shoulder 22A, which abuts against the inner races of bearings 15 and 16 to space the bearings apart. The shoulder has a length substantially equal to the distance between the bearings when they are properly positioned in the bearing apertures of the hub. Cylindrical end sections 22B and 22C of the sleeve are of a suitable diameter and length to permit them to be inserted within and frictionally engage the inner races of the bearings so as to isolate the axle bore of the inner race from axle 23. Axle aperture plugs, bearing sleeves and bearings associated with each wheel are identical.

As illustrated in FIGS. 2 and 3, an axle aperture plug 9 is positioned on each side of the hub and is mateably received within each of the axle apertures of the frame. The axle aperture plug has a laterally extending, generally oblong lug 9A, whose outer periphery 9E is mateably, frictionally received and retained in an axle aperture of the frame. A collar 9C extending radially outwardly from the lug and having outer periphery 9B, bears against the inner surface 24 of the adjacent side rail.

As illustrated in FIG. 2, an axle bore 9D passes entirely through lug 9A and is sized to receive axle 23 therein. The axle bore is positioned eccentrically on the oblong lug and has a spacer 9F, in the form of raised annular rim, which encircles the axle bore and extends laterally along axle toward the hub, as shown in FIGS. 3 and 4. When an axle aperture is positioned in an axle aperture, the annular rim provides a washer-like mechanism which contacts the inner race 18 of the adjacent bearing and thereby assures necessary clearance between the outer race of the bearing and the side rails of the frame.

Each of the axles is substantially identical and formed by a bolt 23 having a wide, smoothly contoured head 23A and a threaded end 23B. A nut 25 with an integral lock nut mechanism is threadably received on bolt end 23B. The head and nut collectively comprise a clamping means on the axle by which the axle aperture plugs, the sleeve and the inner races of the bearings may be tightly retained on the skate frame. When the bolt and nut are tightened, the clamping effect forces the annular rims 9F of the axle aperture plugs against the inner race 18 of each bearing and the bearing against the ends of raised shoulder 22A of bearing sleeve 22. With this wheel assembly arrangement, the inner races of the bearings are securely retained, while the outer race of each bearing rotates freely about the axle to permit easy and fast rotation of the wheels.

Owing in large part to the major improvements in the design of the boot shell, skate frame and wheels in the above-described skate, in-line skating has become an increasingly popular outdoor sport. It is estimated that over six million people now use in-line skates in the United State of America alone. Typically, the areas with the highest degree of participation have been along boardwalks, all-purpose trails, or lake-front parks such as those commonly found in California, Chicago, Boston, New York and Florida. However, the sandy conditions associated with these sandy areas has consistently posed a major problem to the in-line skater. Specifically, the wheel bearings of prior art in-line skates are exposed to the elements, making them subject to contamination from particles of dirt and grit on the pavement, which are kicked up by the rotation of the wheels. These particles work their way into the inner parts of the wheel bearings, causing excessive wear, poor performance and early bearing failure.

In addition, the static electrical charge which builds up on the surface of the bearings during the rotation of the wheels, tends to draw some of the dirt particles toward the bearing and further contributes to the problem. The degree of damage caused by this problem can vary greatly depending upon the conditions to which the wheel bearings are exposed. However, the efficiency of the bearings can be substantially reduced after just a few hours of use, and it is not uncommon for one or more of the bearings to fail completely in shorter periods of time. In rental businesses which typically inventory as many as two hundred pairs of skates, the above-described problem becomes multiplied. Naturally, these businesses rely on the maintenance of their in-line skates to be in good working condition in order to protect their investment and minimize liability. Presently, replacement and maintenance of wheel bearings in in-line skates is expensive and time consuming.

Earlier approaches to solve the above-described problem were directed toward improved bearing design. Specifically, several different types of bearings having built-in bearing shields have been proposed. However, these prior art bearings have been generally ineffective in preventing dirt from entering the bearing.

Unable to adequately protect bearings from dirt and other environmental contaminates, more recent prior art efforts have been directed toward designing a user-serviceable bearing having a removable plastic or rubber shield which permits access to the internal parts of the bearing for periodic cleaning and lubrication. This prior art approach suffers from a number of significant shortcomings and drawbacks. In particular, the bearing cleaning process involves removing each of the wheels, then removing the bearings and then the bearing shield. The use of a toxic cleaning solvent is required to remove the dirt and old grease (or lubricant) inside the bearing housing. Then, each bearing must be re-packed with grease and the bearing seals replaced. Thereafter, the skate must be reassembled. Consequently, this prior art approach is both laborious and time intensive.

While prior art "bearing caps" of the type disclosed in U.S. Pat. Nos. 4,962,968, 4,511,182 and 4,408,803 have been proposed for skate bands and tandem-type roller skates, such prior art methods of protecting wheel bearings are generally inapplicable to in-line type roller skates.

Thus, there presently is a great need in the in-line roller skate art for an improved way of protecting wheel bearings from dirt and like contaminates.

OBJECTS OF INVENTION

Accordingly, it is a primary object of the present invention to provide a method and apparatus for protecting the wheel bearings of in-line roller skates without the accompanying shortcomings and drawbacks of prior art techniques.

Another object of the present invention is to provide a method of protecting the wheel bearings in in-line roller skates without changing the overall performance of the skates.

A further object of the present invention is to provide such a method using axle aperture plugs, each of which, attach to the skate frame and have a bearing cover which effectively seals the inner and outer races of the wheel bearing, thereby deflecting dirt and other materials away therefrom without adversely affecting the overall performance of the skate.

Another object of the present invention is to provide such an axle aperture plug which can be easily installed in any in-line skate, regardless of the size or shape of its wheels.

A further object of the present invention is to provide such an axle apparatus plug which has a protective bearing flange that provides a consistent and uniform seal with an adequate amount of pressure along its locus of contact with the outer race cover.

These and further objects of the present invention will become apparent hereinafter.

SUMMARY OF THE PRESENT INVENTION

According to one of the broader aspects of the present invention, a device for protecting the bearings of the in-line roller skates is provided in the form of an axle aperture plug. Each axle aperture plug comprises a spacer portion, a transverse axle bore and a protective flange. The spacer portion has an inner bearing surface for engaging the inner race and spacing the outer race from the frame of the in-line skate. The transverse axle bore through the spacer portion permits passage of an axle along the central axis of rotation of the wheel. The transverse axle bore has a cross-sectional diameter allowing the entire length of the axle to be slidably insertable through the transverse axle bore. The protective flange is disposed about the spacer portion and has a surface which extends symmetrically away from the transverse axle bore and terminates in an outer bearing surface adapted for proximate positioning with respect to the outer race of the wheel bearing when the aperture plug is installed in the in-line roller skate. In this way, the wheel bearing is protected from exposure to particulate contaminants during use of the in-line roller skate by the skater.

BRIEF DESCRIPTION OF THE DRAWINGS

For a more complete understanding of the present invention, the Detailed Description Of the Illustrative Embodiment is to be taken in connection with the following drawings, in which.

DETAILED DESCRIPTION OF THE ILLUSTRATIVE EMBODIMENT

Figure 1:
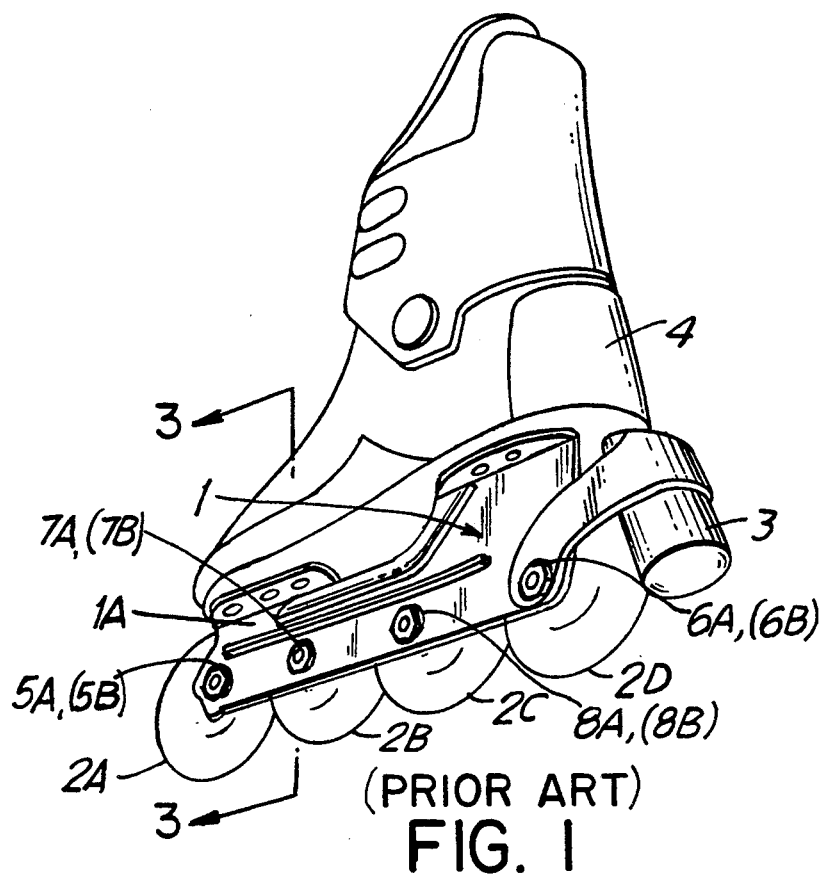
FIG. 1 is a perspective view of a prior art in-line roller skate in which the axle aperture plug of the present invention can be installed.
Figure 2:
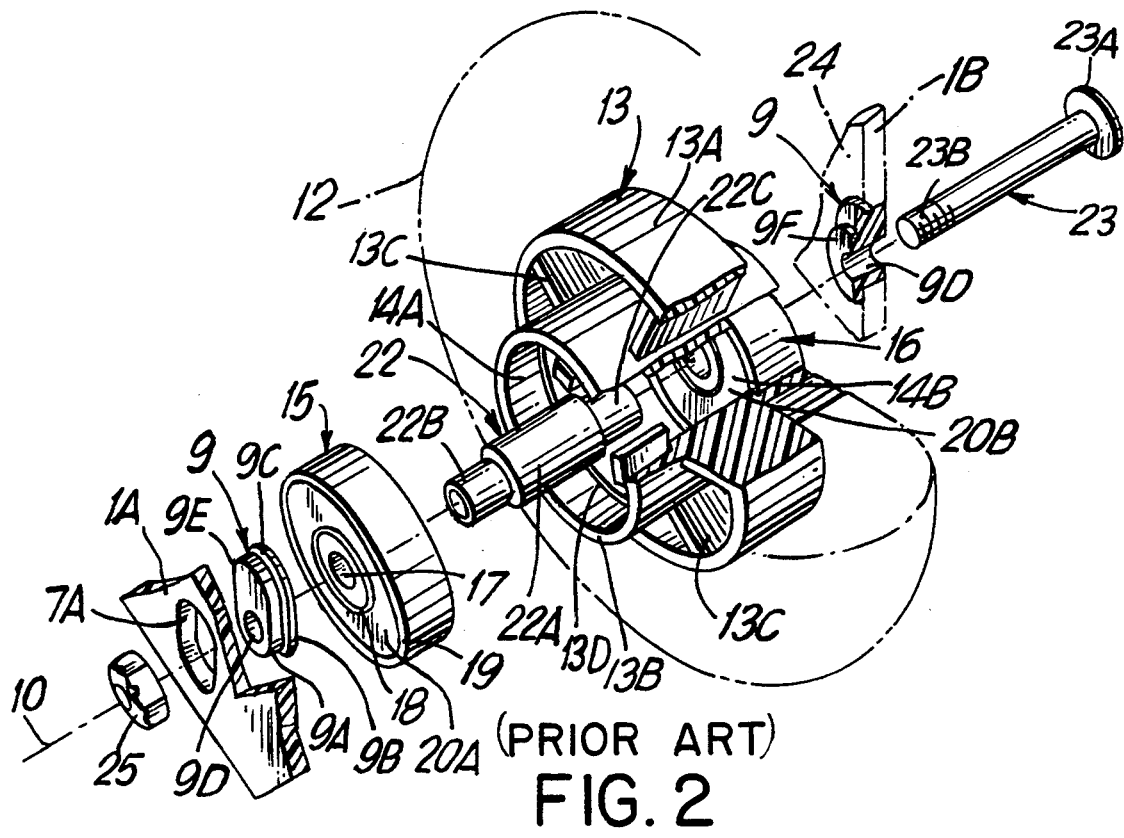
FIG. 2 is an exploded, partially cut away view of a wheel assembly in the prior art in-line roller skate of FIG. 1.
Figure 3:
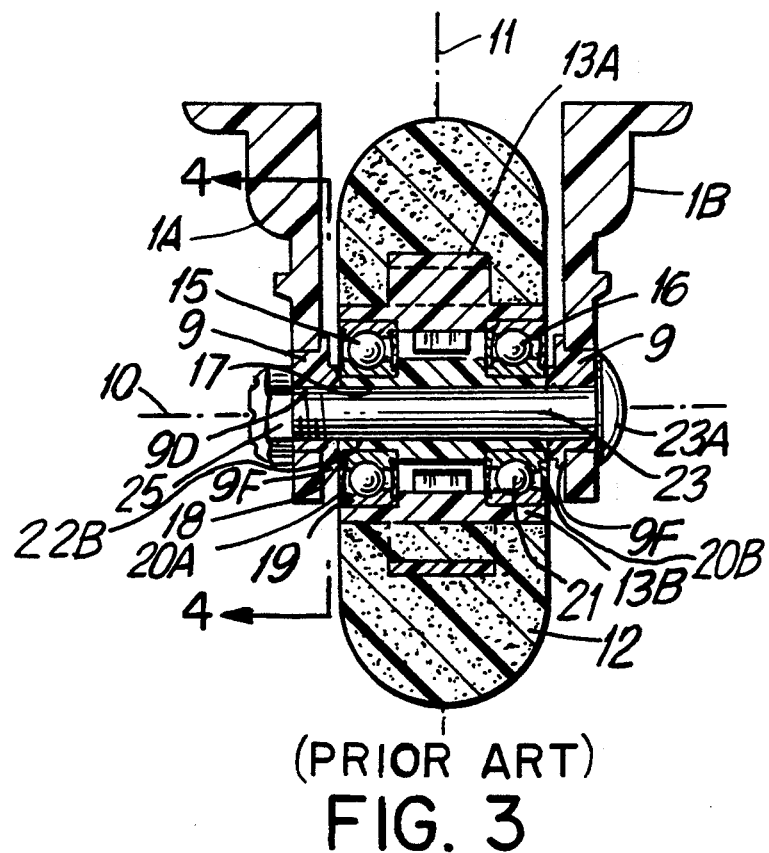
FIG. 3 is an elevated, cross-sectional end view of a wheel assembly, taken along line 3—3 of FIG. 1.
Figure 4:
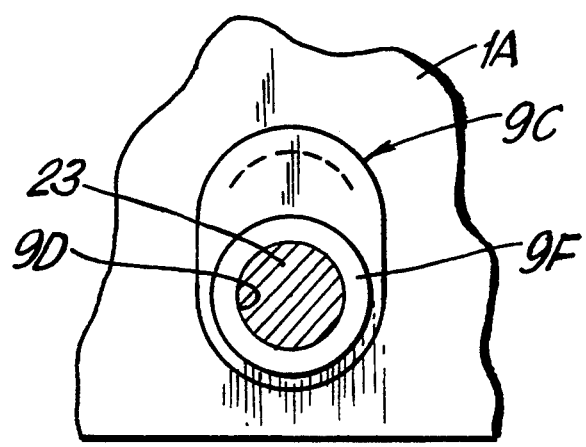
FIG. 4 is an elevated side view of a prior art axle aperture plug, taken along line 4—4 of FIG. 3.
Figure 5:
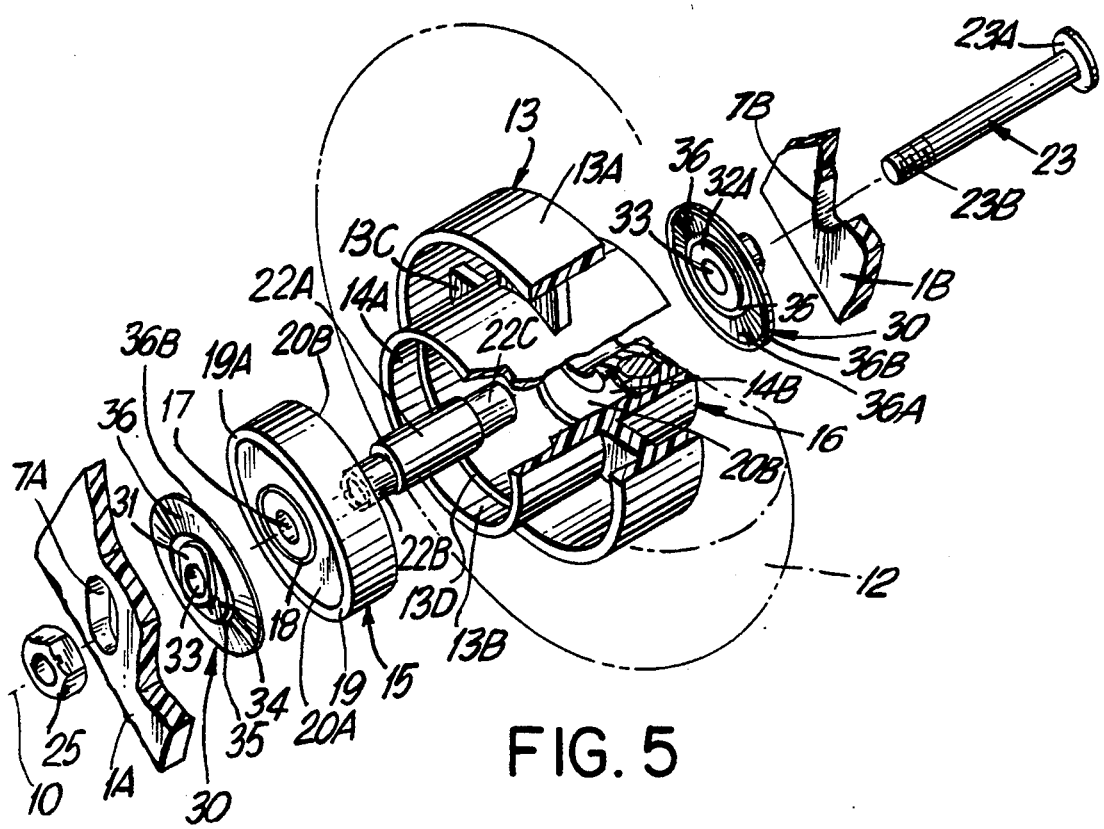
FIG. 5 is an exploded, partially cut away view of a wheel assembly in which a pair of aperture axle plugs of the present invention are shown being installed in a prior art in-line roller skate.

In FIG. 5, a pair of axle aperture plugs 30 the present invention are shown being installed within a wheel assembly of the conventional in-line roller skate of FIG. 1. As more clearly illustrated in FIGS. 6A, 6B and 6C, each axle aperture plug of the present invention comprises an oblong lug portion 31, a spacer portion 32, a axle bore 33, a stabilizing platform 34, a base portion 35, and a protective bearing cover 36. Oblong lug portion 31 has a front end 31A and a rear end (not shown) which extends laterally and has dimensions which permit it to be frictionally received and retained in axle aperture 7A in a frame rail 1A, 1B of a conventional in-line roller skate. The lug portion has a depth substantially equal to the thickness of the side rails of the in-line roller skate frame so as to completely fill the axle aperture from one side of the side rail to the other.

Stabilizing platform 34 has a generally oblong geometry, is attached to the rear side of the lug portion, and extends radially outwardly in a plane parallel to the front end of the lug portion. Stabilizing platform 34 is adapted to bear against the inner surface of the adjacent side rail and functions to stabilize the axle aperture plug when the lug portion is received in the axle aperture of the side rail of the frame. In the illustrative embodiment, the thickness of the stabilizing platform is about 0.020 inches.

Figure 6A:
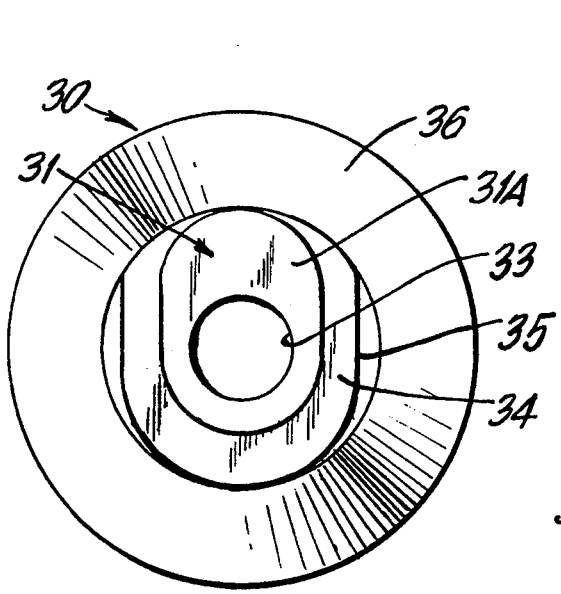
FIG. 6A is an elevated front axial view of the axle aperture plug of the present invention, showing the prospective bearing cover circumferentially disposed about the axle bore.
Figure 6B:
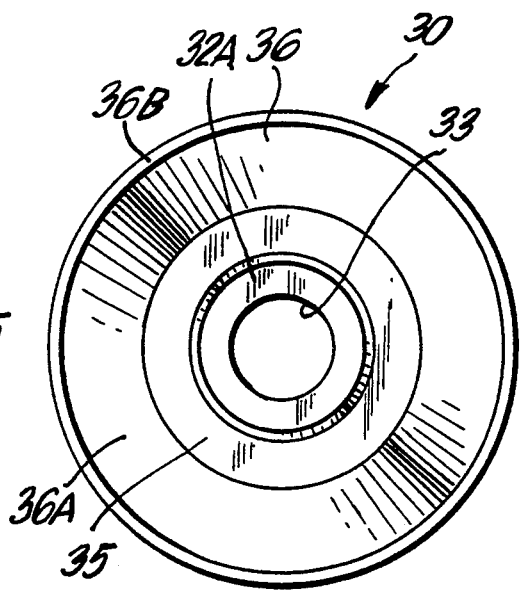
FIG. 6B is an elevated rear axial view of the axle aperture plug of the present invention, showing the spacer portion, axle bore, and outer and inner bearing surfaces.
Figure 6C:
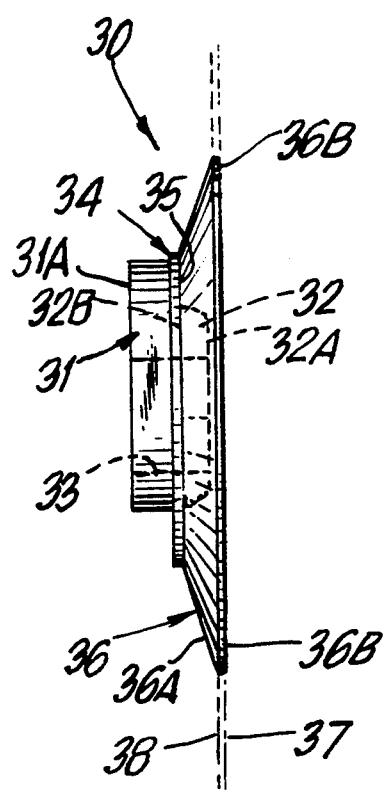
FIG. 6C is an elevated, side view of the axle aperture plug of the present invention, showing the spatial relationship between the outer and inner bearing surfaces.

As illustrated in FIG. 6C, axle bore 33 passes entirely and transversely through lug portion 31 and has suitable dimensions for receipt of axle 23 therethrough. As shown, axle bore 33 is positioned eccentrically on the oblong lug portion so that axle plug may be inserted into the axle aperture 7A, 7B in either of two distinct orientations, described in detail in U.S. Pat. No. 5,048,848. In the illustrative embodiment, spacer portion 32 is realized as a raised annular rim, which extends from the rear end of the lug portion, encircles axle bore 33 and terminates in a flat annular shaped inner bearing surface 32A. In the illustrative embodiment, the axial length of axle bore 33 is about 0.175 inches and its cross-section about 0.250 inches. As will be described in greater detail hereinafter, inner bearing surface 32A is adapted for engagement with the flat annular shaped outer face 16A of the adjacent bearing.

As shown in FIG. 6A, base portion 35 extends from the rear side of mounting platform 34 and has a generally circular geometry. In the illustrative embodiment, the thickness of base portion is about 0.003 inches. As shown, protective bearing cover 36 is realized in the form of a flexible annular flange 36A which extends from the perimeter of base portion 35, and is circumferentially disposed about spacer portion 32 and axle bore 33.

As shown in FIGS. 6A and 6B, protective flange 36A has a truncated-conical surface which geometrically extends away from transverse axle bore 33 and terminates in an outer bearing surface 36B which is adapted for low frictional engagement with the flat annular-shaped face of the outer bearing race. As best shown in FIG. 6C, flat outer bearing surface 36B is disposed in a first plane 37 transverse to axle bore 33, whereas flat inner bearing surface 32A is disposed in a second plane 38 transverse parallel to first plane 37. In the preferred embodiment, the first and second planes are separated by a distance of 0.003 inches, with tolerances +0.0001 inches and −0.004 inches (i.e. from about −0.001 to about 0.0031 inches). In this way, when the axle aperture plug is made in accordance with the above-specified positive tolerance limit, and is clamped between the frame rails, protective flange 36A flexes and the inner and outer bearing surfaces 32A and 36B become substantially coplanar, sealing the bearings within the saucer-shaped bearing cover provided by the protective flange. Alternatively, when the axle aperture plug is made in accordance with the above-specified negative tolerance limit and is clamped between the frame rails, protective flange 36A will be disposed at a very small distance (e.g. 0.001 inches) away from the outer face 19A of the outer bearing race, effectively sealing the bearings within saucer-shaped bearing cover provided by the protective flange. In order to provide protective flange 36A with flexible properties and suitable lubricity, the entire axle aperture plug is preferably made from nylon using injection molding technology well known in the art.

In the illustrative embodiment, the outer diameter of outer bearing surface 36A is 0.825 inches and the inner diameter thereof is 0.750 inches. Preferably, these dimensions should be maintained within ±0.002 inch so that a proper seal is established with the outer face 19A of the outer bearing race 19. The outer diameter of inner bearing surface 32A is 0.450 inches, whereas the inner diameter thereof is 0.250 inches, with the tolerance maintained to about ±0.005 inches.

Figure 7:
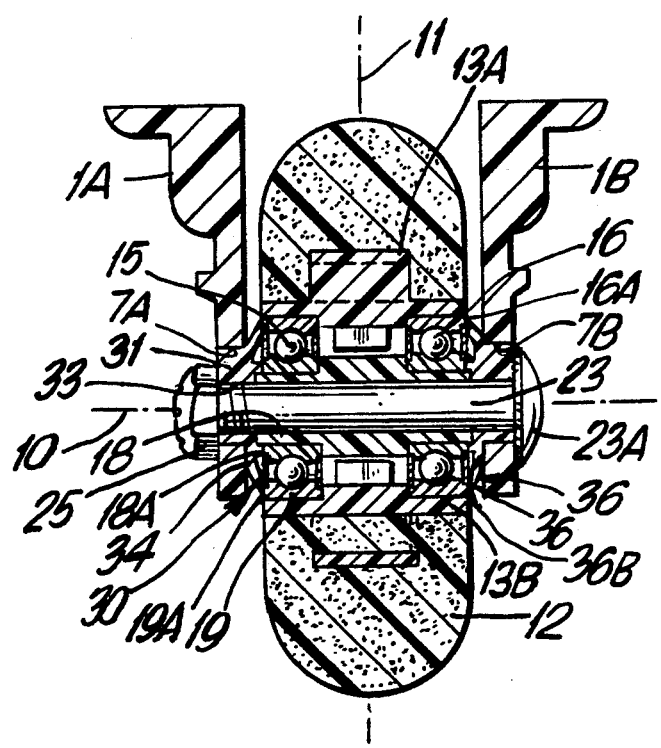
FIG. 7 is an elevated, cross-sectional end view of a wheel assembly, in which a pair of axle aperture plugs of the present invention are installed.

Upon assembly of the wheel and axle components, as shown in FIGS. 5 and 7, the tightening of fastener nut 25 will cause outer bearing surface 36B to first contact the outer face 19A of the outer race and after undergoing a slight degree of flexure, the inner bearing surface 32A will contact the flat outer face 18A of the inner race of the bearing. To enable this "bearing sealing" operation, the difference between the inner and outer bearing surfaces 32A and 36A (i.e. the first and second planes) should be maintained within the following range of tolerances: +0.0001 inches and −0.004 inches. It will be understood that these tolerances depend on several variables: (i) the thickness of the wall of the disk, (ii) the flexibility of the material after molding; and (iii) the lubricity thereof. All of these factors will have a direct effect upon the amount of friction produced from the pressure applied between outer bearing surface 36B and flat outer face 19A of the outer race of the wheel bearing. It has been found through experimental research that the negative tolerance at this locus of contact is higher then the positive tolerance, i.e., even a very small gap of not more than 0.001 inches would be acceptable and still provide a favorable result. However, if the spacing between the first and second planes of the inner and outer bearing surface exceeds 0.003 inches when in its relaxed (i.e. uncompressed) state, then a noticeable amount of frictional drag will result between the outer bearing surface 32A and the outer face 19A of the outer race, adversely affecting the performance of the skate in direct proportion to the angular velocity of the skate wheels.

Preferably, the axle aperture plugs of the present invention are installed in in-line roller stakes as follows.

As illustrated in FIG. 5, an axle aperture plug of the present invention is inserted into each one of the coaxially aligned pairs of axle apertures formed in the frame. Then, one wheel assembly is positioned between one such pair of axle aperture plugs. Thereafter, wheel axle 23 is inserted through the central axle bores of wheel bearings 15 and 16 and the transverse bores in the pair of axle aperture plugs. Then the pair of axle aperture plugs and the wheel bearings are clamped between the frame by threading nut 25 on the threaded end of wheel axle 23 and tightening the same. This procedure is repeated for each of the wheels in the in-line roller skate. When assembled in the manner described above, each wheel is free to rotate about its axle with outer bearing surface 36B being in low frictional engagement with outer face 19A of the outer race. With this arrangement, the wheel bearings are effectively protected from exposure to particulate containments during use of the in-line roller skate.

While the particular embodiment shown and described will be useful in many applications in the in-line roller skate art, further modifications of the present invention herein disclosed will occur to persons skilled in this art. All such modifications are deemed to be within the scope and spirit of the present invention defined by the appended claims.

What is claimed is:

1. An axle aperture plug for installation in an in-line roller skate usable by a skater on a riding surface, said in-line roller skate including at least three wheels, at least three wheel axles, a frame, and clamping means, each said wheel having a central axis of rotation, each said wheel axle having a predetermined length and being positional on said central axis of rotation, said frame carrying said wheel axles so as to rotatably mount said plurality of wheels on said frame and to substantially center all said wheels substantially perpendicular to a common plane, each said wheel including a tire member, a hub, and bearing means including an inner and outer race, carried by said hub and supported on one of said wheel axles, said tire member being supported on said hub, and said frame including a plurality of axle apertures being arranged in pairs of axle apertures, with the axle apertures of each said pair confronting each other and being positioned on one said wheel axis of rotation, and said clamping means being disposed on each said wheel axle for attaching said wheel axle to said frame and clamping a pair of said axle apertures plugs between said inner race and said frame, each said axle aperture plug comprising:

a spacer portion having an inner bearing surface for engaging said inner race and spacing said outer race from said frame;

a transverse axle bore through said spacer portion for passage of one said axle along one said central axis of rotation of said wheel, said transverse axle bore having a cross-sectional diameter allowing the entire length of said axle to be slidably insertable through said transverse axle bore; and a protective flange disposed about said spacer portion and having a surface symmetrically extending away from said transverse axle bore and terminating in an outer bearing surface adapted for proximate positioning with respect to said outer race when said aperture plug is installed in said in-line roller skate, so that said bearing means is protected from exposure to particulate contaminants during use of said in-line roller skate by said skater, wherein said outer bearing surface is disposed in a first vertical plane and said inner bearing surface is disposed in a second vertical plane, and said first vertical plane is separated from said second vertical plane.

2. The axle aperture plug of claim 1, wherein said first vertical plane is separated from said second vertical plane by a distance in the range of about −0.001 to about 0.0031 inches.

3. The axle aperture plug of claim 1, wherein said protective flange is made from a flexible material so that when said axle aperture plug is clamped between said frame and said inner race, said protective flange flexes and said outer and inner bearing surfaces become substantially coplanar.

4. The axle aperture plug of claim 3, wherein said protective flange has a truncated conical geometry.

5. The axle aperture plug of claim 1, wherein the outer diameter of said outer bearing surface is about 0.825 inches and the inner diameter of said outer bearing surface is about 0.750 inches.

6. The axle aperture plug of claim 1, wherein the outer diameter of said inner bearing surface is about 0.450 inches and the inner diameter of said inner bearing surface is about 0.250 inches.

7. A method of protecting wheel bearings in an in-line roller skate usable by a skater on a riding surface, said in-line roller skate including at least three wheels, at least three wheel axles, and a frame, each said wheel having a central axis of rotation, each said wheel axle having a predetermined length and being positional on said central axis thereof, said frame carrying said wheel axles so as to rotatably mount said plurality of wheels on said frame and to substantially center all said wheels substantially perpendicular to a common plane, each said wheel including a tire member, a hub, and a wheel bearing means including inner and outer races, carried by said hub and supported on one said wheel axle, said tire member being supported on said hub, and said frame including a plurality of axle apertures being arranged in pairs of axle apertures, with the axle aperture of each said pair confronting each other and being positioned on one said wheel axis of rotation, said method comprising the steps for each said wheel:

(a) installing an axle aperture plug in each one of said pair of axle apertures to provide a pair of axle aperture plugs installed in said frame, each said axle aperture plug including (i) a spacer portion having an inner bearing surface for engaging said inner race and spacing said outer race from said frame, (ii) a transverse axle bore through said spacer portion for passage of one said axle along one said central axis of rotation of said wheel, said transverse axle bore having a cross-sectional diameter allowing the entire length of said axle to be slidably insertable through said transverse axle bore, and (iii) a protective flange disposed about said spacer portion, said protective flange having a surface symmetrically extending away from said transverse axle bore and terminating in an outer bearing surface adapted for proximate positioning with respect to said outer race when said aperture plug is installed in said in line roller skate wherein said outer bearing surface is disposed in a first vertical plane and said inner bearing surface is disposed in a second vertical plane, and said first vertical plane is separated from said second vertical plane;

(b) positioning one said wheel between said pair of axle aperture plugs;
(c) inserting one said wheel axle through said wheel bearing means of one said wheel and the transverse bores in said pair of axle aperture plugs in said frame; and
(d) clamping the pair of said axle apertures plugs and said wheel bearing means between said frame using a clamping means, so that each said wheel is free to rotate on one said axle and said outer bearing surface is proximately positioned with respect to said outer race so as to protect said wheel bearing means from exposure to particulate containments during use of said in-line roller skate by said skater.

8. The method of claim 7, wherein in step (a), the separation between said first and second vertical planes is in the range of about −0.001 to about 0.0031 inches.

* * * * *